United States Patent
Hannig et al.

(10) Patent No.: US 12,304,234 B2
(45) Date of Patent: May 20, 2025

(54) METHOD FOR PRODUCING A DECORATIVE PANEL COMPRISING THE APPLICATION OF A FILM TO A SUBSTRATE BY MEANS OF ELECTROSTATIC CHARGING

(71) Applicant: AKZENTA PANEELE + PROFILE GMBH, Kaisersesch (DE)

(72) Inventors: Hans-Jürgen Hannig, Bergisch Gladbach (DE); Peter Wendling, Mörsdorf (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 257 days.

(21) Appl. No.: 17/911,486

(22) PCT Filed: Mar. 10, 2021

(86) PCT No.: PCT/EP2021/056103
§ 371 (c)(1),
(2) Date: Sep. 14, 2022

(87) PCT Pub. No.: WO2021/185656
PCT Pub. Date: Sep. 23, 2021

(65) Prior Publication Data
US 2023/0347684 A1    Nov. 2, 2023

(30) Foreign Application Priority Data
Mar. 20, 2020    (EP) ................................. 20164611

(51) Int. Cl.
*B44C 5/04* (2006.01)
*B32B 38/00* (2006.01)
*B44C 1/10* (2006.01)

(52) U.S. Cl.
CPC ............ *B44C 5/04* (2013.01); *B32B 38/0008* (2013.01); *B32B 38/145* (2013.01); *B44C 1/10* (2013.01); *B32B 2451/00* (2013.01)

(58) Field of Classification Search
None
See application file for complete search history.

(56) References Cited

U.S. PATENT DOCUMENTS

2017/0157977 A1    6/2017    Hannig
2023/0347684 A1    11/2023    Hannig et al.

FOREIGN PATENT DOCUMENTS

| AT | 504620 A1 | 6/2008 |
| CN | 106414101 A | 2/2017 |
(Continued)

OTHER PUBLICATIONS

Machine Translation of DE 2201472.*
(Continued)

*Primary Examiner* — Christopher T Schatz
(74) *Attorney, Agent, or Firm* — Harness, Dickey & Pierce, P.L.C.

(57) ABSTRACT

The present invention proposes a method for producing a decorative panel comprising the application of a film (12) to a substrate (14), having the method steps: a) providing a substrate (14) that is to be provided with the film (12), b) providing a film (12), and c) applying the film (12) to at least one subregion of the substrate (14), wherein d) the film (12) is electrostatically charged before being applied to the substrate (14), wherein e) the substrate (14) is electrostatically charged before the film (12) is applied to the substrate (14), wherein f) the electrostatic charging of the substrate (14) and of the film (12) is performed such that the film (12) and the substrate (14) are oppositely electrostatically charged, g) introducing locking means at edges of the substrate (14), and h) applying a decoration to the substrate (Continued)

(14) before the film (12) is applied to the substrate (14), or applying a decoration to the film (12).

8 Claims, 1 Drawing Sheet

(56) References Cited

FOREIGN PATENT DOCUMENTS

| | | |
|---|---|---|
| DE | 1104679 B | 4/1961 |
| DE | 2201472 A1 | 9/1973 |
| EP | 2942208 A1 | 11/2015 |
| EP | 3034273 A1 | 6/2016 |
| EP | 4121301 A1 | 1/2023 |
| FR | 2414070 A2 | 8/1979 |
| WO | WO-2018141912 A1 | 8/2018 |
| WO | WO-2021185656 A1 | 9/2021 |

OTHER PUBLICATIONS

Canadian Office Action regarding Patent Application No. 3174470, dated Nov. 8, 2023.
European Office Action regarding Patent Application No. 20164611.4, dated Feb. 28, 2024.
Chinese Office Action regarding Patent Application No. 2021800225056, dated Jan. 9, 2024.

\* cited by examiner

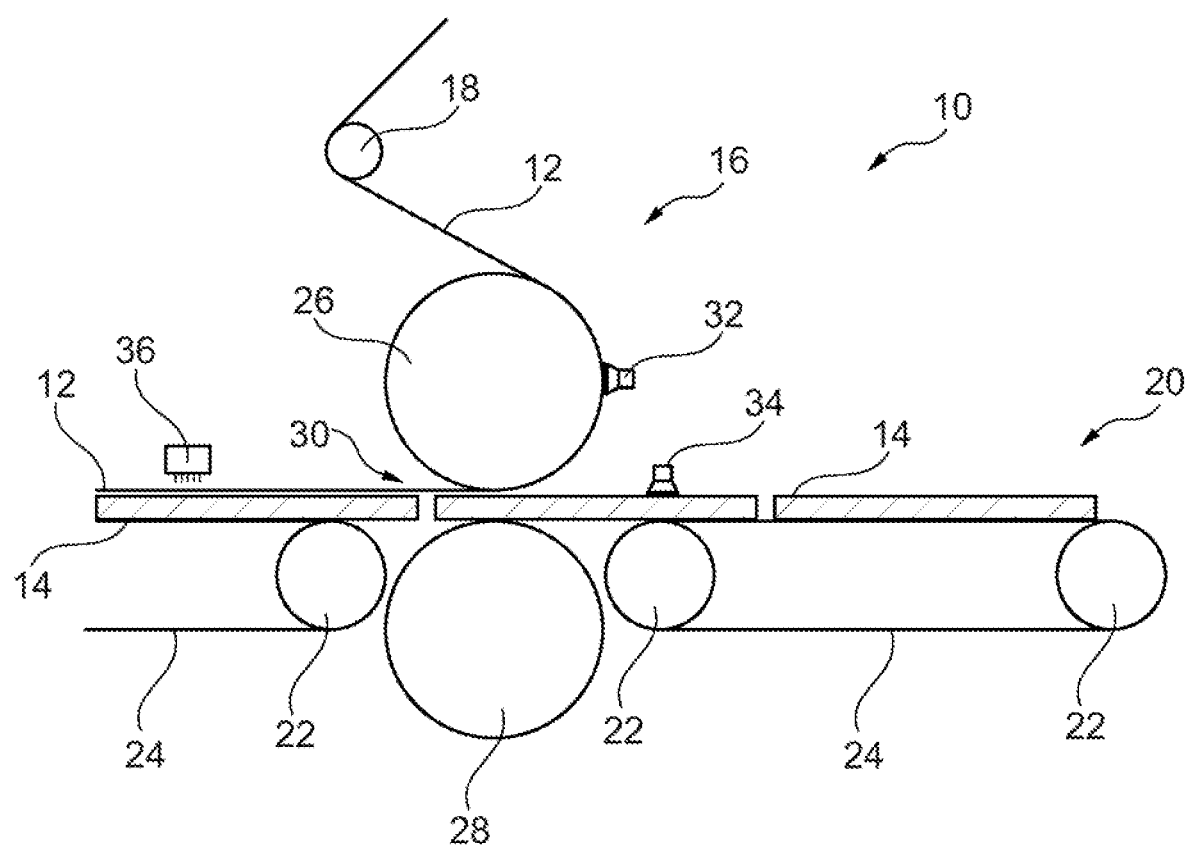

METHOD FOR PRODUCING A DECORATIVE PANEL COMPRISING THE APPLICATION OF A FILM TO A SUBSTRATE BY MEANS OF ELECTROSTATIC CHARGING

The present invention relates to a method for producing a decorative panel comprising the application of a film to a substrate. In particular, the present invention relates to a method in which a film is laminated onto a substrate as part of a production process of a decorative panel.

In the sense of the invention, the term decorative panel is understood to mean wall, ceiling, door or floor panels which have a decoration applied to a carrier plate. Decorative panels are used in a variety of ways, both in the field of interior design of rooms and for the decorative cladding of buildings, for example in exhibition stand construction. One of the most common fields of application of decorative panels is their use as floor covering, for covering ceilings, walls or doors. The decorative panels often have a decoration and a surface structure that is intended to imitate a natural material.

In the course of producing a decorative panel, for example, it may be desired to laminate a film onto a substrate. Subsequently, the substrate laminated with the film can undergo further processing steps or can remain unchanged.

A disadvantage of the processes known in the prior art is that microbubble formation may occur after laminating a film onto a substrate. This can however reduce the quality of the product and therefore lead to waste.

The lamination of a film to a substrate, for example as part of the production of a decorative panel, can therefore under certain circumstances still offer potential for improvement.

It is therefore the object of the present invention to at least partially overcome at least one disadvantage of the prior art. More specifically, it is the object of the present invention to provide a solution for an improved lamination of a film to a substrate, for example as part of the production of a decorative panel.

This object is achieved by a method for producing a decorative panel comprising the application of a film to a substrate with the features according to claim 1. Preferred embodiments of the invention are provided in the subclaims or in the description, wherein further features described or shown in the subclaims or in the description may individually or in any combination constitute a subject matter of the invention if the context does not clearly indicate the contrary.

The invention proposes a method for producing a decorative panel comprising the application of a film to a substrate, including the method steps of:
a) providing a substrate to be provided with the film,
b) providing a film, and
c) applying the film to at least a partial area of the substrate, wherein
d) the film is electrostatically charged before being applied to the substrate, wherein
e) the substrate is electrostatically charged prior to the application of the film to the substrate, and wherein
f) the electrostatic charging of the substrate and the film are carried out in such a way that the film and the substrate are electrostatically charged oppositely,
g) inserting interlocking means at the edge of the substrate, and
f) applying a decoration onto the substrate prior to applying the film to the substrate or applying a decoration onto the film.

By such a method, in the production process of a decorative panel, an improved application of a film to a substrate can be enabled.

In particular, the present method is used for applying a film to a substrate. Such a method is also referred to as laminating and can in principle be used in a wide range of applications. However, it may be particularly advantageous if the method described is used as a part of the production of a decorative panel.

The method comprises the following steps.

First of all, according to process step a), a substrate is provided, which is to be provided with the film or to which the film is to be applied. The type of substrate is basically not restricted, insofar as the substrate can serve as a subsurface or carrier for the film. In other words, a substrate can basically be understood as any structure that serves as a subsurface for a film to be laminated. In the case of the production of a decorative panel, however, the substrate may be a suitable substrate for this purpose. A substrate can then be understood to mean in particular a layer serving as a core or base layer in a finished panel, which may in particular comprise a natural material, such as a wood-based material, a fiber material or a material comprising a plastic. For example, the substrate can provide or contribute to a suitable stability of a panel. In particular, the substrate may be a web-like substrate or plate-like substrate. For example, such a substrate may be formed of plastic, wherein such a substrate may be formed of pure plastic or a plastic material. In this context, a plastic material is to be a material which, in addition to the pure plastic, may comprise further constituents, in particular fillers, such as mineral or inorganic constituents.

Furthermore, the method according to method step b) comprises providing a film which is to be applied to the substrate. The design of the film is basically not restricted and, in particular, depends on the later use of the film or of the composite of film and substrate. Preferably, the film can be formed from a plastic, preferably a thermoplastic. For example, the film can be provided by means of a feed device, wherein the film can be guided to the substrate and onto its surface, for example by use of rollers.

Subsequently, according to method step c), the film is applied to at least a partial area of the substrate. Thus, for example, the entire substrate, for example an entire surface of the substrate, can be provided with the film, or the substrate can be provided only partially with the film.

This can be realized, for example, by guiding the film to the substrate as described above and subsequently, for example by means of a roller, for example by use of temperature increased relative to the ambient temperature (220° C.) and of pressure increased relative to the ambient pressure (1 bar), the film is pressed onto the substrate. This method step can also be described as laminating and can in principle be carried out in a selectable form. For example, within the scope of the invention wet lamination or dry lamination is to be encompassed, in which the lamination is carried out by means of a wet or dry laminating agent. For example, a lacquer layer may be provided on the substrate, such as on a decoration applied onto the substrate, wherein lacquer layer serves as a liquid laminating agent. However, a dry laminating agent is also possible in principle.

Furthermore, as indicated above, thermal laminating is encompassed, in which the laminating is carried out at elevated temperature and with elevated pressure, but in particular without a laminating agent. The parameters to be selected, such as temperature and pressure, can here be selected by a person skilled in the art in an understandable manner based on the materials of the substrate and the film.

Thermal lamination parameters are material dependent. Basically, the thermal lamination parameters are to be selected with respect to the material of the film and the substrate for thermoplastic materials in the range greater than the Vicat softening point and less than the melting point (for (partially) crystalline polymers), and also above the Tg, e.g. for PET. If the thermal parameters have been optimized, only very low pressure is required. This is particularly the case if the substrate and the film are well matched to each other. Exemplary values here include, for example, for polypropylene a temperature of 140 to 155° C. and a pressure of 1 to 10 bar, or for PETG (glycol-modified PET) a temperature of 90 to 110° C. and a pressure of 1 to 10 bar.

If the substrate and the film are made of different polymers, basically an adhesive and/or bonding layer or hotmelt should be used as the laminating agent. Moreover, coextruded thermoplastic functional layers, which are firmly bonded to the substrate or film during the production, such as EVA (ethylene-vinyl acetate copolymer) or a grafted MAH (maleic anhydride grafted polymer), are conceivable as bonding layer. The lamination parameters are then adjusted to these functional layers between film and substrate. Exemplary parameters then include for example for EVA a temperature of 70° C. to 100° C., depending on the vinyl acetate content in the EVA, and a pressure of 1 to 10 bar.

After this step, the film may be firmly fixed to the substrate. If necessary, a post-treatment, such as drying or curing of the laminating agent or also of the film, can be carried out.

In the method described, it is further provided that, according to method step d), the film is electrostatically charged before being applied to the substrate, and that, according to method step e) the substrate is electrostatically charged before the film is applied to the substrate. Basically, electrostatic charging can be carried out as is known from the prior art in other fields and described in detail later.

Basically, however, it is envisaged that the electrostatic charging of the substrate and the film are carried out in such a way that the film and the substrate are electrostatically charged oppositely. For example, the substrate may be negatively charged and the film may be positively charged, or conversely, the substrate may be positively charged and the film may be negatively charged.

This method step can allow an electrostatic attraction to exist between substrate and film. This allows for a particularly intimate contact, in particular when the substrate is provided with the film in a large area.

The intimate contact and further adhesion of the film to the substrate can thus enable that air inclusions can be reliably prevented or at least significantly reduced compared to prior art methods. By preventing or reducing air inclusions, the formation of bubbles, for example in the form of microbubbles, can also be prevented or at least significantly reduced.

This allows a particularly high surface quality, so that waste can be reduced or waste based on bubble formation can be reduced or even completely prevented.

In addition, long-term stability can be improved in this way. This is because due to the intimate adhesion of the film to the substrate prior to lamination, caused by the electrostatic charges of substrate and film, moreover, lamination can enable a particularly intimate adhesion of the film to the substrate. Thus, the risk of subsequent detaching of the film from the substrate at a later stage can be significantly reduced. This is because, in the case of the same charging of film and substrate, the risk of repulsion cannot be excluded even after lamination. According to the invention, however, this can now be prevented.

The advantages described above, caused by an appropriate charging of substrate and film can be achieved in a simple manner by use of the method described herein even in already existing film lamination systems. All that is needed to implement the method described is appropriate equipment for electrostatic charging of film and substrate, which in most cases can usually be retrofitted without difficulty even in existing systems.

Preferably, electrostatic charging can be carried out in such a way that the film is positively charged and the substrate is negatively charged. It has been shown that the processing of film and substrate with such a charging is possible without any problems. Furthermore, basically according to the invention, but particularly effectively in this embodiment a reduction in the amount of lacquer applied, for example as a laminating agent in the case of wet lamination can be enabled, wherein, for example, a reduction down to 40 g/m$^2$, for example down to 30 g/m$^2$ or even below can be possible. Furthermore, in principle according to the invention, but particularly effectively in this embodiment, a reduction of the calendering pressure can be enabled, which can enable a reduction of wear.

It may be further preferred that the film is charged to a range of $\geq 50$ V to $\leq 150$ V, preferably $\geq 80$ V to $\leq 120$ V, such as 100 V. Alternatively or additionally, it may be preferred that the substrate is charged to a range of $\geq -750$ V to $\leq -150$ V, preferably $\geq -600$ V to $\leq -400$ V, such as $-500$ V. Such charge values can be implemented without any problems, even by use of readily available means for electrostatic charging. In addition, such an opposite charging can enable an intimate adhesion, even over large areas, of the film to a sheet and at the same time permit further treatment and transport of the components without any significant negative effect on these steps.

It may further be preferred that at least one of the substrate and the film is electrostatically discharged before being electrostatically charged. In this embodiment, the advantages described above can be achieved in a particularly safe and defined manner. This is because by electrostatic charging after electrostatic discharge it can be achieved that a particularly defined and homogeneous electrostatic charge in a precisely defined area is enabled, since local peak charges can be prevented.

For example, a discharge can be carried out in a range from greater than 0 kV to less than or equal to 20 kV. Particularly preferably, the film and the substrate are discharged to a charge value of 0 prior to an electrostatic charging.

With respect to an electrostatic charging and an electrostatic discharge, it may further be preferred that a device for applying electrostatic charges for carrying out method step d) or e) comprises at least one of a strip, a roller, a brush or a lip formed at least partially from an electrically conductive material, and an ion beam device. Alternatively or additionally, it may be provided that a device for dissipating electrostatic charges comprises at least one of a strip, a roller, a brush or a lip formed at least partially from an electrically conductive material, and an ion beam device.

For example, a device for supplying or dissipating electrostatic charges can be designed as a strip which makes electrically conductive contact with the substrate and/or the film and which preferably comprises an arrangement aligned essentially parallel to a surface of the film and/or of the substrate and transverse to the advance direction of the film and/or the substrate. Essentially parallel can mean in particular a deviation or tolerance of 20%, in particular 10%, for example ≤1%, of the distance of the surface of the strip to the surface of the film or of the substrate. In principle, the strip can be positioned above and/or below the surface to be charged. By use of such a design, even large surfaces can be discharged and charged homogeneously and in a defined manner.

Alternatively or additionally, it can be provided that the device for dissipating electrostatic charges and/or applying electrostatic charges comprises at least one roller, brush or lip made of a conductive material, which makes electrically conductive contact with the substrate and/or the film.

In the case of a discharge, it may be provided that the corresponding device for dissipating electric charges is connected to an electric mass potential. The electrical mass potential may be provided, for example, by a grounding device. In the case of charging, the device for supplying electrical charges may be connected to a source of charge.

The strip, roller, brush or lip is preferably formed of a material having a conductivity $1 \times 10^3$ Sm$^{-1}$, at least in the area of contact with the lacquer-containing top layer.

It can also be provided, that the charging and/or discharging device comprises an ionization device, by means of which an ionized air jet is passed over the surface of the film or the substrate. Such a device may also be referred to as an ion beam device. It has been shown that exposure to ionized air is suitable for further reducing or increasing the occurrence of electrostatic charging of the substrate.

Furthermore, it may be preferred that the substrate is formed from a plastic. Particularly preferably, the substrate may include a material comprising a plastic and, if appropriate, further components. Plastics which can be used in the production of corresponding panels or substrates are, for example, thermoplastics, such as polyvinyl chloride, polyolefins (for example, polyethylene (PE), polypropylene (PP)), polyamides (PA), polyurethanes (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymers thereof. The plastics may contain conventional fillers, for example calcium carbonate (chalk), aluminum oxide, silica gel, quartz flour, wood flour, gypsum. They may also be colored in a known manner. Preferably, the substrate may comprise talc as a filler material, such as in an amount, based on the total material of the substrate, from 30 wt.-% to 70 wt.-%, in particular from 40 wt.-% to 60 wt.-%. In addition, it may be provided that the substrate has a multilaminar structure, i.e. consists of a plurality of films. Here, the films can be the same as or different from the film to be laminated.

Such plastic substrates are preferred for many applications, in particular for decorative panels, and can furthermore be electrostatically charged and discharged without difficulty, so that the method can be carried out without difficulty, in particular in this embodiment.

With regard to the film, it may be preferred that it is formed from plastic, for example consists thereof or also has other components. More precisely, the film may comprise an acrylate-based plastic composition, in particular a polyurethane-modified acrylate plastic composition, wherein the film comprises the plastic composition in an at least partially, for example completely, cured form so that it can be transported for lamination and treated accordingly. Any required final curing of the film can optionally be carried out in a further step following the lamination. This can be done, for example, by high-energy and short-wave UV radiation and, in addition to the radical polymerization of the acrylate groups, leads to additional crosslinking of the monomers. This considerably increases the surface hardness.

This advantageously ensures that the film is flexible overall and at the same time has particularly good protective properties, such as stability, scratch resistance, heat resistance, water resistance and the like, for many different applications, for example as a protective layer of a decorative panel.

Preferably, the plastic composition of the film may comprise a dipropylene glycol diacrylate, preferably in an amount of >0 to ≤15 wt.-%, based on the plastic composition, and a reaction product of pentaerythritol, epichlorohydrin and acrylic acid, preferably in an amount of ≥2 to ≤15 wt.-%, based on the plastic composition.

Furthermore, however, the film may also be composed of other, in particular thermoplastics, such as polyethylene terephthalate (PET).

Furthermore, it may be preferred that the application of the film to the substrate is carried out as a thermal lamination. This embodiment can be particularly advantageous, since an additional laminating agent can be dispensed with. As a result, the method may be easy to implement in terms of the periphery and may further be enabled at low cost. Here, a treatment at an elevated temperature and an elevated pressure can be easily implemented, in particular for plastic films, such as those described above. Furthermore, by means of the electrostatic charging of film and substrate described above a strong and long-term stable bond between substrate and film can be achieved despite an absent laminating agent.

The method of producing a decorative panel according to the invention comprises the further method steps:

g) introducing locking means at edges of the substrate; and h) applying a decoration to the substrate before applying the film or applying a decoration to the film.

In this method, a lamination of the film as described is thus used to form a decorative panel. In this case, for example, the substrate may be a plastic substrate and the film may be a plastic film as described above.

To form a decorative panel, interlocking means are provided at edges of the substrate, for example circumferentially. This can be realized, for example, by machining the edges of the substrate, as is known basically from the prior art. In this way, a stable composite can be formed from a large number of panels as a floor covering or ceiling covering or wall covering in a likewise known manner.

With regard to the structure of the panel, the film can be provided at various positions in the panel structure. For example, the film can serve as a decoration subsurface, so that the film can be laminated directly onto the substrate material or another layer of the substrate and the film can then be provided, for example by means of a digital printing process, with a decoration imitating, in particular, a decoration template. Furthermore, the film can already be printed before being applied to the substrate and thus serve as a decorative film. Thus, the film can be provided with a decoration, in particular printed, before or after application to the substrate.

Accordingly, it may be provided that method step h) comprises printing the substrate before applying the film to the substrate and/or method step h) comprises printing the film before or after applying the film to the substrate.

Preferably, the film may be used as a wear film. In this embodiment, method step h) may thus comprise printing the substrate before applying the film. The printing of the substrate can in turn be carried out by means of a digital printing process.

In the embodiment of the film as a protective layer or wear layer, the film can serve as a protective layer and cover the decoration upwards, thus protecting the decoration and the substrate from external influences.

In this case, it can be provided that the film serves as a wear base film and is provided with a haptic. This is because to protect the applied decorative layer, wear or top layers are usually applied above the decorative layer. In many cases, it is envisaged that a surface structuring imitating a decoration template is introduced into such wear or top layers, so that the surface of the decorative panel has a haptically perceptible structure, which is adapted in its shape and pattern to the applied decoration, in order to obtain an imitation of a natural material as faithful as possible also in terms of the haptic.

For the application of the haptic, it may be provided that a further layer provided with a structure is applied to the film. For this purpose, it may be preferred that, after the film has been applied to the substrate, the film is coated with a textured lacquer layer or with a lacquer-containing top layer, i.e. with a lacquer layer that is structured and cured. The latter can be done, for example, by means of UV radiation. In particular, if the film and the lacquer are made of the same material, for example the material as described above, moreover, a final curing of the film can be achieved by means of curing, for example final curing, of the lacquer in order to fix the structure. A structuring of the lacquer can be carried out, for example, by a press or printing of a displacement ink, wherein the lacquer layer is preferably partially cured before the structure is introduced.

Furthermore, a further film can be laminated, in particular according to the method described above, which is then provided with a structure.

Alternatively, it may be provided that the film itself is provided with a structure. This may be possible, for example, by providing the laminated film with a structure after application to the substrate or by providing the film to be laminated with a structure before application to the substrate, for example by means of embossing means.

It may further be provided that the film and/or the lacquer-containing top layer comprises hard materials, preferably in an amount between 5 wt.-% and 40 wt.-%, wherein the hard materials preferably have an average grain diameter between 10 μm and 250 μm. Examples include titanium nitride, titanium carbide, silicon nitride, silicon carbide, boron carbide, tungsten carbide, tantalum carbide, aluminum oxide (corundum), zirconium oxide, zirconium nitride, or mixtures thereof.

With respect to further advantages and technical features of the method for producing a decorative panel, reference is made to the description of the method for applying a film to a substrate, the FIGURE and the further description.

The invention is further explained below with reference to a FIGURE.

FIG. 1 shows a schematic representation of an arrangement for carrying out a method according to the invention.

FIG. 1 shows an arrangement 10 by means of which a film 12 can be applied to a substrate 14. For this purpose, a feed device 16 is shown, by means of which the film 12 can be provided. The feed device 16 comprises, for example, a deflecting roller 18. Furthermore, a conveying system 20 is shown, on which a plurality of plate-shaped substrates 14 can be conveyed. The conveying system 20 comprises circulating belts 24 guided by rollers 22, on which the substrates 14 rest.

Moreover, calender rollers 26, 28 are shown, between which a roller gap 30 can be formed. The substrate 14 travels on the belts 24 into the roller gap 30 and the film 12 is guided by the calender roll 26 into the roller gap 30 onto the substrate 14. In the view according to the FIGURE, the substrate 14 and the film 12 enter the roller gap 30 from the right to the left side. In the roller gap 30, the film 12 can be applied to the substrates 14. For this purpose, the calender rollers 26, 28 or at least the calender roller 26 guiding the film 12 can be heated, if necessary, and a contact pressure of the film 12 can be exerted to the substrate 14 by the calender rollers 26, 28. As a result, the film 12 can be applied to the substrate 14, for example, by means of thermo lamination. However, it should be mentioned that in principle also the substrate 14 can be heated and that freely selectable heating means can be used for heating the substrate 14 and the film 12.

Downstream the calender rolls 26, 28 and downstream the roller gap 30, respectively, the film 12 is firmly bonded to the substrate 14 in the case of thermo lamination.

When a laminating agent, such as a lacquer, is used, this can be cured by the radiation unit 36, which emits UV radiation, for example. As a result, the film 12, which is still merely in the adhesive bed upstream the radiation unit 36, can adhere firmly to the substrate 12 downstream the radiation unit 36. For example, the radiation unit 36 may be located in an area approximately 200 mm downstream the roller gap 30.

Subsequently, further processing steps may follow, such as providing a structured lacquer layer on the film 12 or basically structuring the surface. Furthermore, upstream or downstream the roller gap 30, locking means can be introduced into edges of the substrate 14, for example if the method is to be used as part of the production of a decorative panel. For example, in the latter case, a decoration can also be applied to the substrate 14, which can likewise be done upstream or downstream the roller gap 30.

In order to enable a particularly high-quality application of the film to the substrate, moreover, a device 32 for applying electrostatic charges to the film 12 is provided, and a device 34 for applying electrostatic charges to the substrate 14 is further provided. The devices 32, 34 are respectively designed, for example, as a strip, which preferably has an arrangement extending preferably parallel to a surface of the film 12 or of the substrate 14 and aligned transversely with respect to the conveying direction of the film 12 or of the substrate 14.

This may enable the film 12 to be electrostatically charged before being applied to the substrate 14, and the substrate 14 to be electrostatically charged before the film 12 is applied to the substrate 14. More specifically, the electrostatic charging of the substrate 14 and the film 12 is to be carried out in such a way that the film 12 and the substrate 14 are electrostatically charged oppositely.

In detail, it may be provided that the film 12 is positively charged and that the substrate 14 is negatively charged, wherein preferably the film 12 is charged to a range of $\geq 50$ V to $\leq 150$ V and wherein preferably the substrate 14 is charged to a range of $\geq -750$ V to $\leq -150$ V.

Not shown are optional means which enable that at least one of the substrate 14 and the film 12, for example both the substrate 14 and the film 12, is/are electrostatically discharged prior to electrostatic charging.

LIST OF REFERENCE SYMBOLS 10 arrangement
12 film
14 substrate
16 feed device
18 deflecting roller
20 conveying system
22 roller
24 belt
26 calender roller
28 calender roller
30 roller gap
32 device for applying electrostatic charges
34 device for applying electrostatic charges
36 radiation unit

The invention claimed is:

1. A method for producing a decorative panel comprising the application of a film to a substrate, including the consecutive method steps a) to g):
   a) providing a substrate to be provided with the film;
   b) providing a film; and
   c) applying the film onto at least a partial area of the substrate, wherein
   d) the film is electrostatically charged before being applied to the substrate, wherein
   e) the substrate is electrostatically charged before the film is applied to the substrate, and wherein
   f) the electrostatic charging of the substrate and the film are carried out in such a way that the film and the substrate are electrostatically charged oppositely; and
   g) inserting interlocking means at edges of the substrate; and
   wherein a decoration is applied onto the substrate prior to applying the film onto the at least partial area of the substrate in step c),
   or wherein a decoration is applied onto the film prior to applying the film onto the at least partial area of the substrate in step c),
   wherein in step f) the film is positively charged to a range of $\geq 50$ V to $\leq 150$ V and wherein the substrate is negatively to a range of $\geq -750$ V to $\leq -150$ V, and wherein the application of the film to the substrate is carried out as wet lamination, wherein a lacquer is provided on the substrate and wherein lacquer layer serves as a liquid laminating agent.

2. The method according to claim 1, wherein a device for applying the electrostatic charges for carrying out method step d) or e) comprises at least one of a strip, a roller, a brush, a lip formed at least partially from an electrically conductive material, and an ion beam device.

3. The method according to claim 1, wherein at least one of the substrate and the film is electrostatically discharged prior to the electrostatic charging.

4. The method according to claim 3, wherein a device for dissipating electrostatic charges comprises at least one of a strip, a roller, a brush, a lip formed at least partially from an electrically conductive material, and an ion beam device.

5. The method according to claim 1, wherein the substrate is formed of plastic.

6. The method according to claim 1, wherein the film is formed from plastic.

7. The method according to claim 1, wherein the film is provided with a structure.

8. The method according to claim 1, wherein a further layer is applied onto the film, wherein the further layer is provided with a structure.

* * * * *